US006899468B2

United States Patent
Ngo et al.

(10) Patent No.: US 6,899,468 B2
(45) Date of Patent: May 31, 2005

(54) OPTICAL FIBER CONNECTORS

(75) Inventors: Hung Viet Ngo, Harrisburg, PA (US); Gary Warner, Dillsburg, PA (US); Larry E. Wareham, Harrisburg, PA (US); Rodd Richard Ruland, Harrisburg, PA (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 10/771,960

(22) Filed: Feb. 4, 2004

(65) Prior Publication Data

US 2004/0156593 A1 Aug. 12, 2004

Related U.S. Application Data

(62) Division of application No. 10/087,351, filed on Mar. 1, 2002, now Pat. No. 6,764,225.

(51) Int. Cl.⁷ .................................. G02B 6/36
(52) U.S. Cl. ........................................ 385/87
(58) Field of Search ................. 385/75, 76, 86–88

(56) References Cited

U.S. PATENT DOCUMENTS

| | | | |
|---|---|---|---|
| 4,611,887 A | 9/1986 | Glover et al. | 350/96.21 |
| 5,101,463 A | 3/1992 | Cubukciyan et al. | 385/72 |
| 5,619,604 A | 4/1997 | Shiflett et al. | 385/59 |
| 5,710,851 A * | 1/1998 | Walter et al. | 385/86 |
| 5,720,628 A | 2/1998 | Usui et al. | 439/502 |
| 5,761,360 A | 6/1998 | Grois et al. | 385/81 |
| 5,828,805 A | 10/1998 | Morlion et al. | 385/59 |
| 5,930,426 A | 7/1999 | Harting et al. | 385/56 |
| 6,116,788 A | 9/2000 | Melchior et al. | 385/59 |
| 6,123,463 A | 9/2000 | Kashihara et al. | 385/60 |
| 6,234,682 B1 | 5/2001 | Nagaoka et al. | 385/78 |
| 6,257,769 B1 | 7/2001 | Watanabe et al. | 385/53 |
| 6,264,371 B1 | 7/2001 | Badeau et al. | 385/55 |
| 6,290,527 B1 | 9/2001 | Takaya et al. | 439/352 |
| 6,302,591 B1 | 10/2001 | Nagaoka et al. | 385/59 |
| 6,374,022 B1 | 4/2002 | Parmigiani et al. | 385/100 |
| 6,409,393 B1 | 6/2002 | Grois et al. | 385/78 |
| 6,419,402 B1 | 7/2002 | Zimmel | 385/86 |
| 6,421,495 B1 | 7/2002 | Hoffmeister et al. | 385/139 |
| 6,431,783 B2 | 8/2002 | Nakajima et al. | 403/275 |

OTHER PUBLICATIONS

US Conec Online, "MTP® Connectors", www.usconec.com, 3 pages, Mar. 26, 2002.
Fitel Global site–Products, "Optical Connectors/Cords", www.fitel.com, 1 page, Mar. 26, 2002.

* cited by examiner

*Primary Examiner*—Khiem Nguyen
(74) *Attorney, Agent, or Firm*—Woodcock Washburn LLP

(57) ABSTRACT

A connector is provided for coupling optic fibers. The connector has a mating end for mating to another connector and a cable end for connection to a fiber optic cable having a jacket. The connector comprises a mating end outer shell, a ferrule, and a cable end outer shell. The mating end outer shell has a cavity for receiving an optic fiber of the cable, the cavity defining an axis through the connector. The ferrule is disposed in the cavity of the mating end outer shell. The cable end outer shell has a body portion and an extension member and is coupled to the mating end outer shell. The extension member extends from body portion, thereby providing an offset for deforming the jacket when the jacket is crimped to the connector.

26 Claims, 14 Drawing Sheets

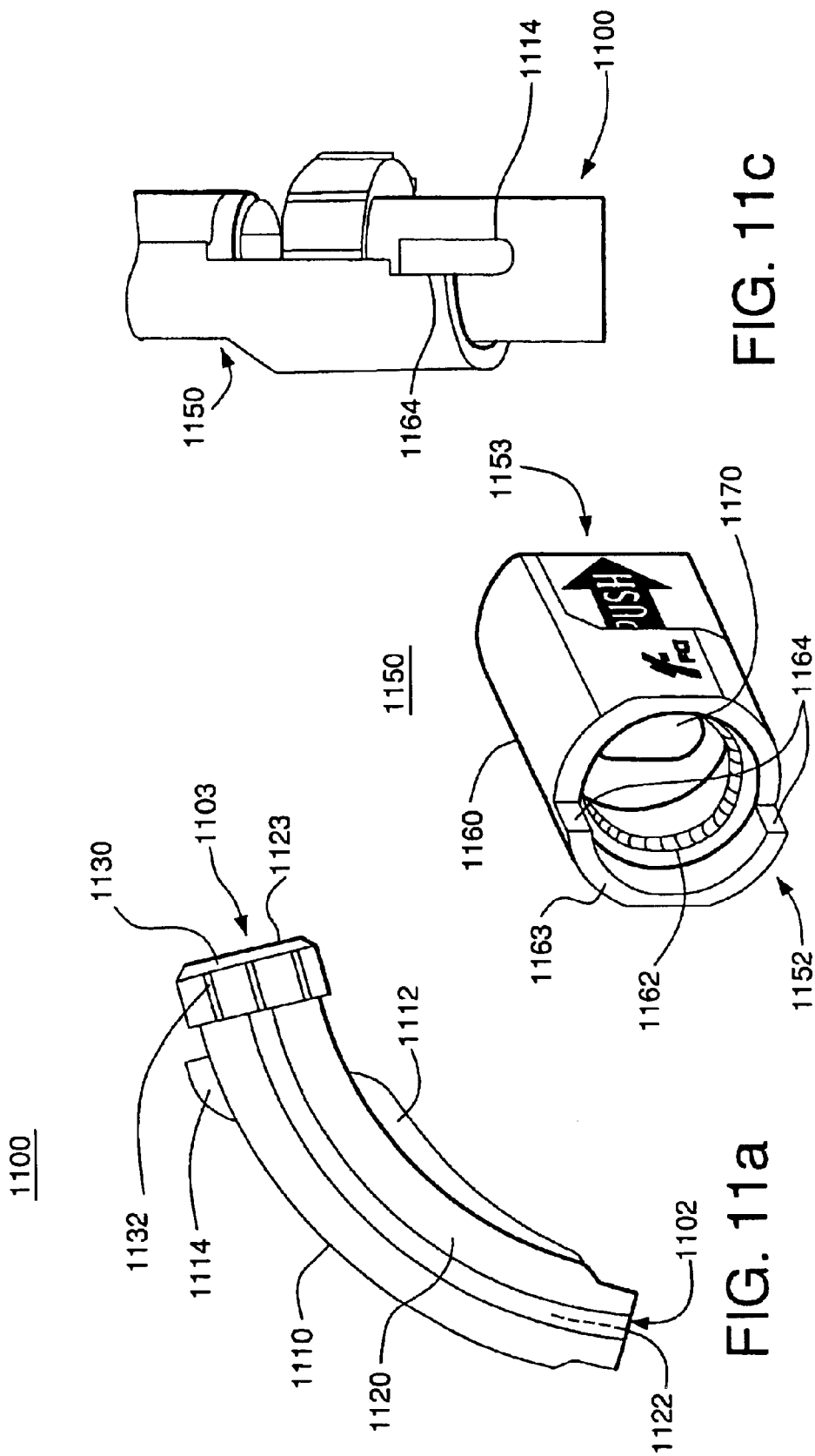

OPTICAL FIBER CONNECTORS

CROSS REFERENCE TO RELATED APPLICATIONS

This application is a divisional application and claims priority under 35 U.S.C. § 120 and § 121 to U.S. patent application Ser. No. 10/087,351 filed Mar. 1, 2002, now U.S. Pat. No. 6,764,225, which is herein incorporated by reference in its entirety.

FIELD OF THE INVENTION

The invention relates to optic fiber connectors. More particularly, the invention relates to the connection of fiber optic cables to optic fiber connectors.

BACKGROUND OF THE INVENTION

Optical communication systems have conventionally employed various kinds of optical connectors for connecting fiber optic cables. In recent years, a Mechanically Transferable (MT) type connector and a Multifiber Push-On (MPO) type connector, capable of being engaged and disengaged simply by a push-pull operation, have been used as connectors that can easily connect or disconnect fiber optic cables. These types of connectors use an MT type ferrule at a mating end of the optical connector. The optic fiber connectors using the MT type ferrule are constructed for easy alignment of the end faces of mating optic fibers by guide pins and are very useful in terms of ease of use, weight, and cost. Proper alignment of the fiber optic cables can be important to signal integrity, and mechanical strength of the connection is often important to maintaining such alignment.

The connector typically has a cable end for connecting a fiber optic cable and a mating end for mating to another connector. At the cable end of the optical connector, fiber optic cables are often terminated with a boot to provide some mechanical strength to the end of the cable, thereby reducing the chance of damage to the cable and any resulting fiber misalignment. Even with a boot, however, the fiber optic cable may move an unacceptable amount within the connector, possibly leading to optic fiber damage or misalignment.

Accordingly, a need exists for a fiber optic connector that provides increased mechanical strength to the connection between a fiber optic cable and the connector.

Further, as is well known in fiber optics, bending or twisting of a fiber optic cable too sharply can lead to a reduction in the signal transmission quality of the cable. However, it is often necessary to bend or twist fiber optic cables to route the cables within, to and from equipment such as computers, connector panels, junctions boxes, etc. Accordingly, fiber optic cables are evaluated to determine a minimum bend radius. As long as a fiber optic cable is bent at a radius that is equal to or greater than the minimum bend radius, there should be no reduction (or an acceptable reduction) in transmission quality. However, if a fiber optic cable is bent at a radius below its minimum bend radius, there is a potential for a reduction in signal transmission quality through the bend. While a cable guide may provide enough reinforcement to limit the bend radius of the cable, a cable guide may not provide protection against fiber optic cable rotation. Such rotation may reduce transmission quality or even break an optic fiber.

Thus, a need exists for a cable guide that can receive a fiber optic cable and circumferentially rotate, yet provide some protection against over-rotation.

SUMMARY OF THE INVENTION

A connector is provided for coupling optic fibers. The connector has a mating end for mating to another connector and a cable end for connection to a fiber optic cable having a jacket. The connector comprises a mating end outer shell, a ferrule, and a cable end outer shell. The mating end outer shell has a cavity for receiving an optic fiber of the cable, the cavity defining an axis through the connector. The ferrule is disposed in the cavity of the mating end outer shell. The cable end outer shell has a body portion and an extension member and is coupled to the mating end outer shell. The extension member provides an offset for deforming the jacket when the jacket is crimped to the connector. The extension member may extend generally radially from the body portion. The body portion may comprise ridges oriented laterally with respect to the axis. In this manner, a crimp sleeve may be secured to the body portion of the connector causing the jacket to deform around the extension member, thereby providing a frictional force that is generally opposite any pulling force on the cable. As such, the mechanical connection between the fiber optic cable and the connector may be strengthened, possibly providing protection against optic fiber damage and fiber optic misalignment at the mating end.

The connector may further comprise a crimp sleeve for crimping the cable jacket to the body portion of the cable end outer shell. The crimp sleeve may include an aperture for gripping the jacket upon crimping. The cable end outer shell may comprise a second extension member extending radially from the body portion distal from the cable end.

The connector may be configured as a push-pull type connector, comprising a coupling sleeve slidably mounted to the mating end outer shell and a spring biasing the coupling sleeve towards the mating end of the connector. The coupling sleeve may comprise an arm extending generally axially along the connector. The arm may comprise a generally axially oriented groove for mating with a corresponding ridge of a backplane housing. The arm may also have a generally circumferentially oriented notch for mating with or without a tool and for removing the connector from the backplane housing.

A boot is provided for a fiber optic cable. The boot comprises a body having a passageway therethrough and a first end and a second end. The first end is adapted to be rotatably coupled to a cable guide. The boot also comprises a rotation control device coupled to the body that limits rotation of the body with respect to the cable guide.

A cable guide is provided for a fiber optic cable. The cable guide comprises a body having a first end and a second end opposite the first end. The first end is adapted to be rotatably coupled to a boot. The body defines a passageway from the first end to the second end for receiving the fiber optic cable. The cable guide also comprises a rotation key coupled to the body that limits rotation of the body with respect to the boot.

The above-listed features, as well as other features, of the invention will be more fully set forth hereinafter.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 11a is a side view of an illustrative cable guide for guiding a fiber optic cable, in accordance with an embodiment of the invention, FIG. 11b is a perspective view of an illustrative boot for mating with a cable guide and/or a connector, in accordance with an embodiment of the invention;

FIG. 11c is a side view of an illustrative boot mated to an illustrative cable guide, in accordance with an embodiment of the invention;

DETAILED DESCRIPTION OF ILLUSTRATIVE EMBODIMENTS

Figure 1:
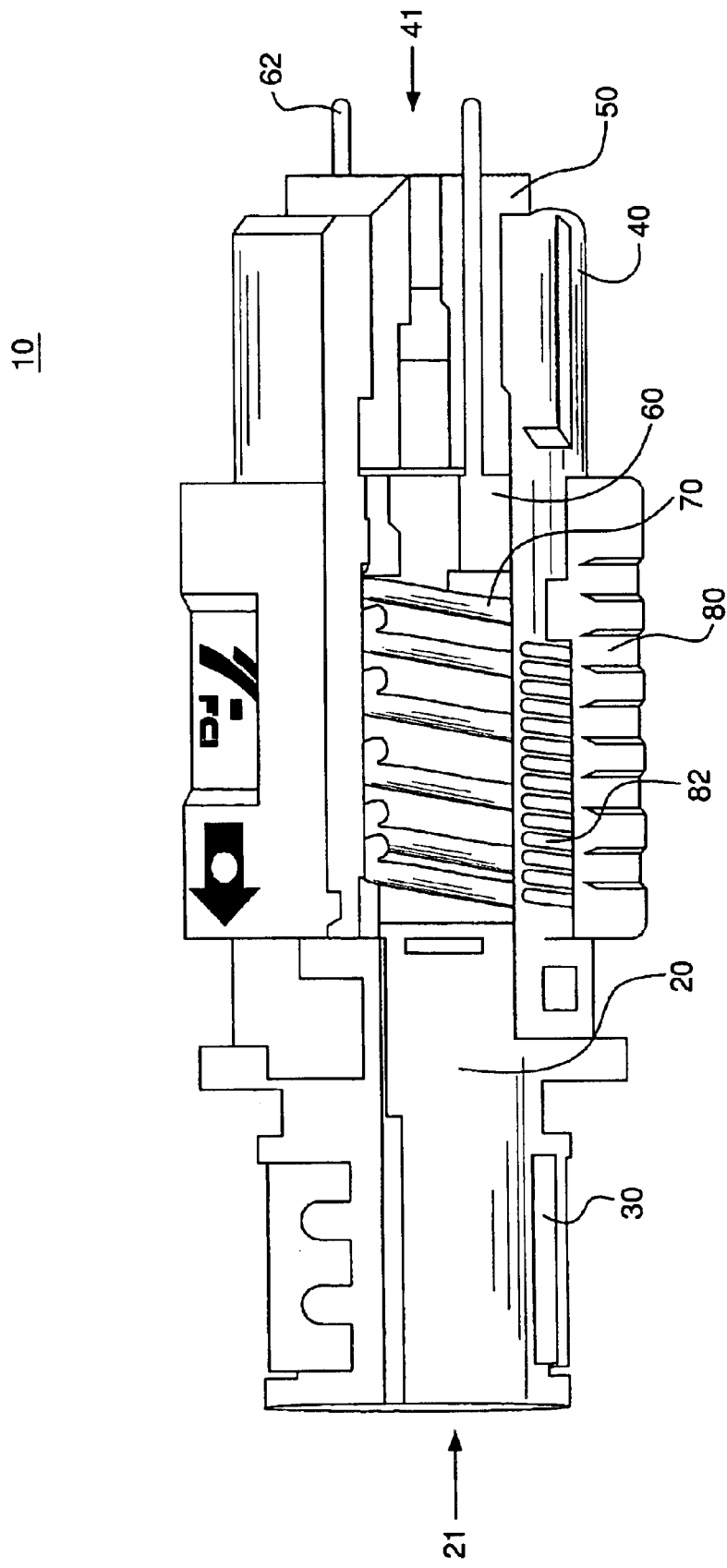
FIG. 1 is a partial perspective cut-away view of an illustrative connector, in accordance with an embodiment of the invention.

Certain terminology may be used in the following description for convenience only and is not considered to be limiting. For example, the words "left", "right", "upper", and "lower" designate directions in the drawings to which reference is made. Likewise, the words "inwardly" and "outwardly" are directions toward and away from, respectively, the geometric center of the referenced object. The terminology includes the words above specifically mentioned, derivatives thereof, and words of similar import.

The invention is directed to a fiber optic connector having increase mechanical strength in the connection between the fiber optic cable and the connector. The connector includes body portion and an extension member extending from the body portion, the extension member provides an offset for deforming a jacket of the cable when the jacket is crimped to the connector. In this manner, a crimp sleeve may be secured to the body portion of the connector causing the jacket to deform around the extension member, thereby providing a frictional force generally opposite any pulling force on the cable. The crimp sleeve can include apertures into which the jacket extends, again providing a frictional force opposite any pulling force on the cable. As such, the mechanical connection between the fiber optic cable and connector may be strengthened, possibly providing protection against fiber optic misalignment at the mating end and optic fiber damage. Further, a boot and a cable guide may be added to the connector to provide some protection against the cable bending and twisting beyond fiber bend and/or twist limitations.

The fiber optic cable construction and design is well known. Fiber optic cables may consist of a pair (or more) of thin channels or optic fibers formed of glass. The thin glass fibers are typically coated with ultraviolet-curable material for protection. The coated fibers are then covered with a thermoplastic material having sufficient stiffness to preclude fiber buckling. Strength yarns or other suitable strength members may surround the coated and covered fibers to withstand tensile forces, which can be caused by pulling on the fiber optic cable, which could otherwise break the fibers. An outer jacket, which may be made of polyvinyl chloride, typically surrounds the coated and covered fibers and the strength yarns. The fiber optic cable can be a fiber optic ribbon cable that is flexible, bendable, and twistable. As described earlier, controlling the bend and twist can limit signal loss.

FIG. 1 shows a connector 10 in accordance with an embodiment of the invention. As shown in FIG. 1, connector 10 has a cable end 21 and a mating end 41. Cable end 21 is for connection to a fiber optic cable (not shown), which may be a cable having a single optic fiber or multiple optic fibers. Multiple optic fiber cables may be tape-like, bundle-like, or any other configuration. Mating end 41 is for mating to another optical connector (not shown), which may be, for example, a connector at an end of an optic cable, a connector coupled to a backplane, and the like. Connector 10 comprises a cable end outer shell 20 at cable end 21 and a mating end outer shell 40 at mating end 41.

Cable end outer shell 20 and mating end outer shell 40 each have a cavity therethrough and mate to each other to form a housing for containing at least a portion of ferrule 50, pin holder 60, and contact spring 70. Coupling sleeve 80 is slidably coupled to the outside of the housing formed by cable end outer shell 20 and mating end outer shell 40. Coupling sleeve 80 cooperates with mating end outer shell 40 to provide a push-pull type connection, for example, a MPO connection. Connector 10 is illustrated as a connector constructed in accordance with a multi-fiber push-on (MPO) standard (for example, JIS C 5981); however, other connector types may be used.

Figure 2:
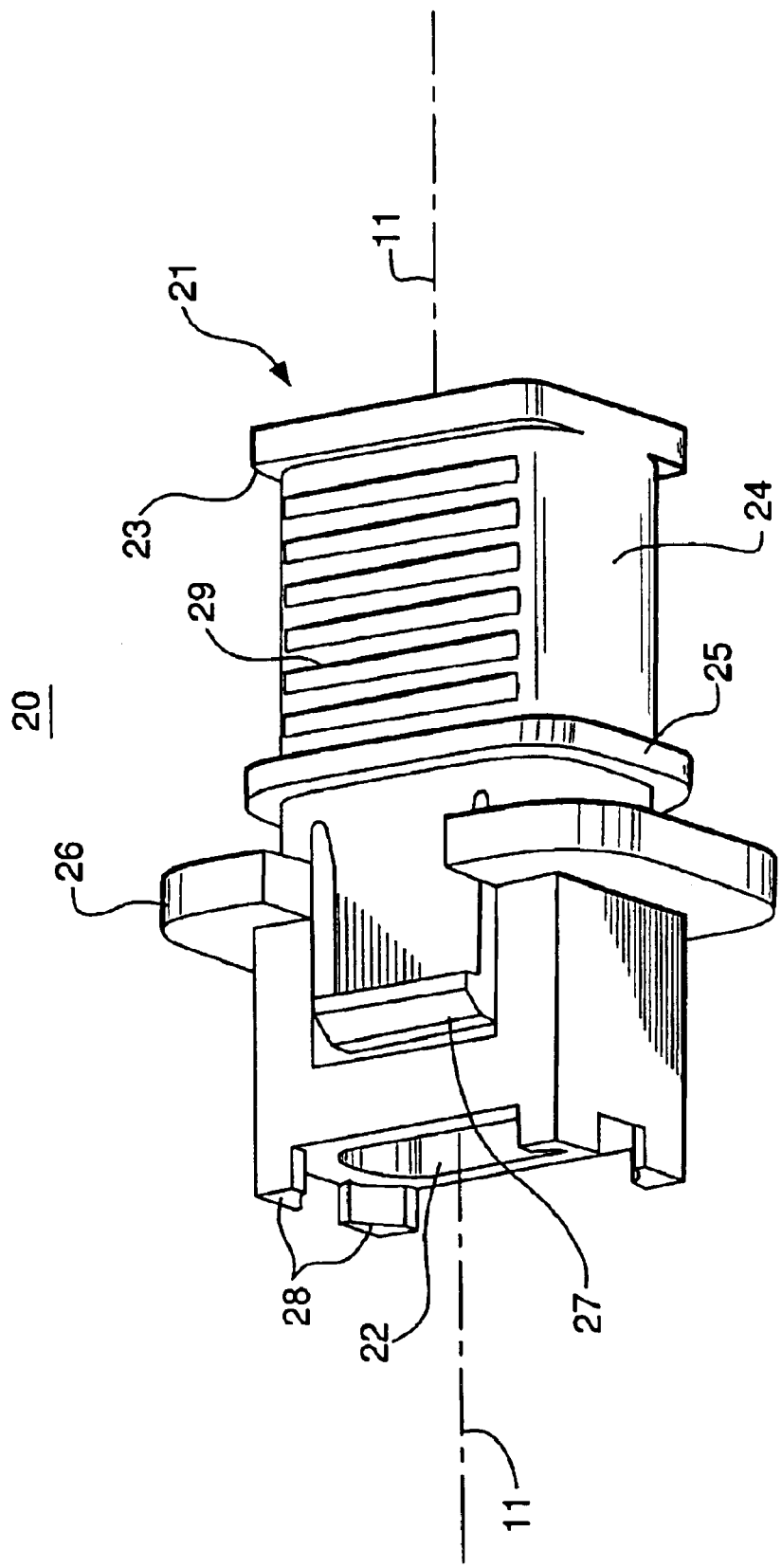
FIG. 2 is a perspective view of an illustrative cable end outer shell, in accordance with an embodiment of the invention.

To further describe cable end outer shell 20, as shown in FIG. 2, cable end outer shell 20 has a cavity 22 therethrough to receive an optic fiber (not shown). Cavity 22 defines an axis 11 through connector 10 and provides space for optic fibers. From cable end 21, cable end outer shell 20 comprises a first extension member 23, a body portion 24, a second extension member 25, and a flange 26. First extension member 23, body portion 24, and second extension member 25 cooperate to provide a crimping area for crimp sleeve 30, as described in more detail below.

Body portion 24 is located between fist extension member 23 and second extension member 25. Body portion 24 is generally tubular in shape and has a generally rectangular cross section as shown; however, body portion 24 may be any shape that cooperates with crimp sleeve 30 to crimp a jacket (not shown) of the fiber optic cable, as explained in more detail below. Body portion 24 also comprises ridges 29 on the top and bottom outside surfaces of body portion 24. Ridges 29 are oriented generally laterally with respect to the axis and provide gripping of the jacket of the fiber optic cable.

Figure 3:
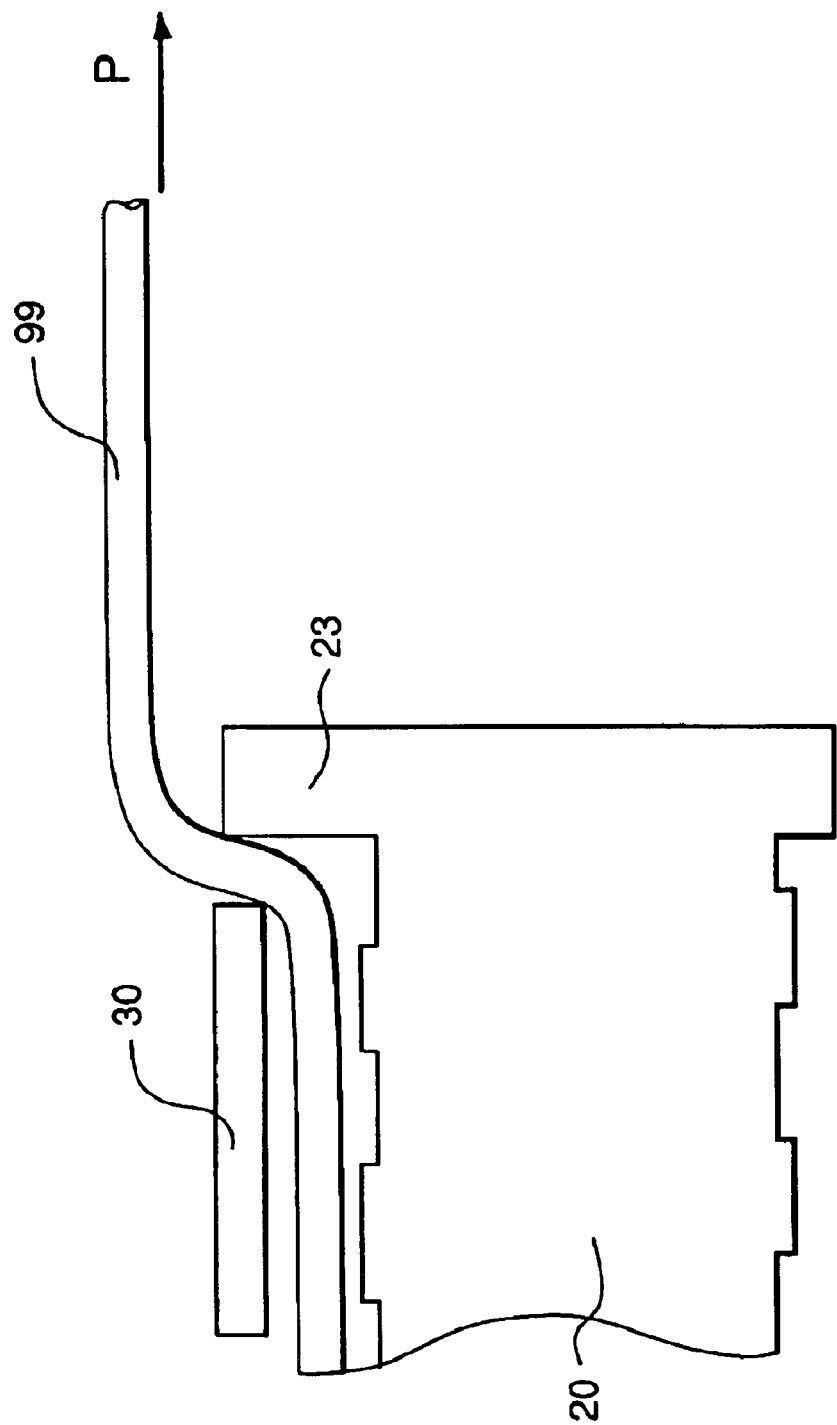
FIG. 3 is a cross sectional view of an exemplary jacket secured between an illustrative cable end outer shell and an illustrative crimp sleeve, in accordance with an embodiment of the invention.

First extension member 23 extends from body portion 24 and is oriented generally laterally with respect to connector axis 11. First extension member 23 is comprised of individual extension members extending from the top and bottom surface of body portion 24, respectively; however, first extension member 23 may be a continuous member, encircling the outer surface of body portion 24. First extension member 23 is located at cable end 21 of connector 10; however, first extension member 23 may be located a distance from cable end 21. First extension member 23 provides an offset that deforms the cable jacket upon crimping. Such deformation secures the jacket to connector 10 in a manner that may reduce the chance of jacket slippage or the jacket being pulled from between the crimp sleeve 30 and the cable end outer shell 20. FIG. 3 illustrates such deformation of a jacket 99. Any pulling force P is resisted by the deformation of jacket 99 near first extension member 23. A boot (not shown) can be applied over body portion 24 and crimp sleeve 30 to provide additional mechanical strength and protection of the cable.

Returning now to FIG. 2, second extension member 25 is located an axial distance from cable end 21 of connector 10 and extends from body portion 24, similar to first extension member 23. The axial length between first extension member 23 and second extension member 24 is slightly larger than the axial length of crimp sleeve 30 so that crimp sleeve 30 may be crimped onto body portion 24 between extension members 23 and 25. In this manner, crimp sleeve 30 is secured between first extension member 23 and second extension member, thereby potentially reducing axial movement of crimp sleeve 30. As such, the mechanical connection between the fiber optic cable and connector 10 may be strengthened, possibly providing protection against fiber optic misalignment at the mating end and optic fiber damage.

Flange 26 is located an axial length from cable end 21 of connector 10 and extends radially from body portion 24. An outer dimension of flange 26 is larger than a corresponding outer dimension of mating end outer shell 40 at the region where mating end outer shell 40 mates with cable end outer shell 20. Flange 26 thereby provides cable end outer shell 20 a positive stop for mating with mating end outer shell 40. Cable end outer shell 20 also comprises a latch 27 to be received in a corresponding recess 42 (FIG. 7) of mating end outer shell 40 to secure outer shells 20, 40 together.

Cable end outer shell 20 also comprises a plurality of nubs 28 extending axially from an end of cable end outer shell 20. Nubs 28 are located at the corners of cable end outer shell 20 and correspond to the shape of contact spring 70 (FIG. 5) to receive and retain contact spring 70 during assembly, as described in more detail below. While individual nubs 28 are shown, contact spring 70 may also be retained with a continuous ridge extending axially from an end of cable end outer shell 20.

Figure 4B:
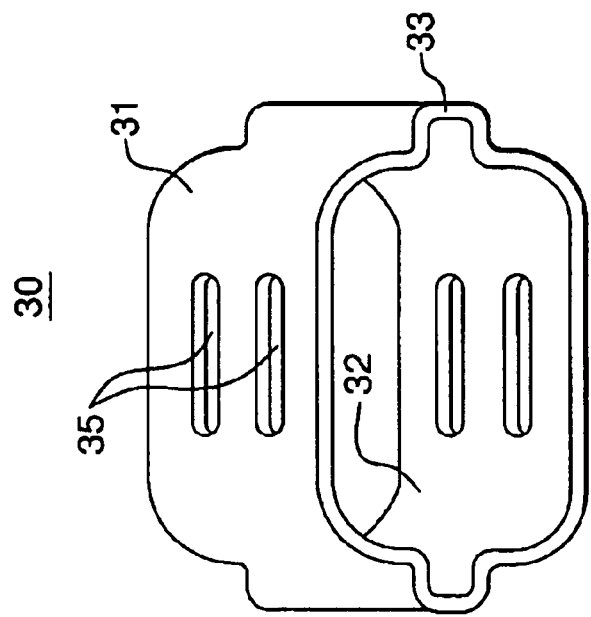
FIGS. 4a and 4b are perspective views of an illustrative crimp sleeve, in accordance with an embodiment of the invention.
Figure 4A:
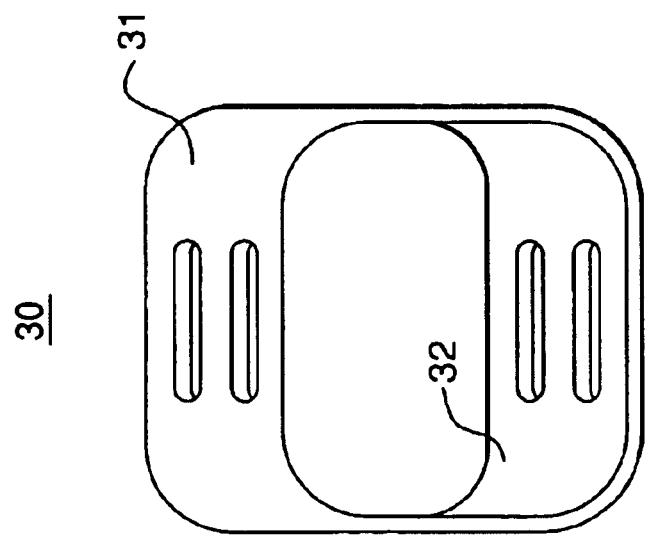

Returning now to crimp sleeve 30, FIG. 4a illustrates crimp sleeve 30 in the non-crimped state, i.e., before compressive forces have been applied to crimp sleeve 30. As shown in FIG. 4a, crimp sleeve 30 is generally tubular in shape and has a substantially rectangular cross-section with rounded corners; however, crimp sleeve 30 may be any shape that cooperates with body portion 24 to secure the cable jacket upon crimping. In the non-crimped state, the inner dimensions of the crimp sleeve are larger that the outer dimensions of cable end outer shell 20 at first extension member 23. Moreover, in the non-crimped state, the inner dimensions of crimp sleeve 30 are larger by an amount such that the jacket of the fiber optic cable may be placed on body portion 24 and crimp sleeve 30 may be slid over first extension member 23 and onto body potion 24.

When crimped, crimp sleeve 30 provides a compressive force on the jacket of the fiber optic cable, the jacket being compressed between body portion 24 and crimp sleeve 30, as best seen in FIG. 3. FIG. 4b shows crimp sleeve 30 in the crimped state. As shown in FIG. 4b, in the crimped state, crimp sleeve 30 has a pair of ears 33 formed during compression of crimp sleeve 30; however, other crimped configurations may be used.

Crimp sleeve 30 has a plurality of apertures 35 extending radially from an inner surface 32 of crimp sleeve 30 to an outer surface 31 of crimp sleeve 30. Aperture 35 is shaped generally rectangularly, with rounded corners, and is oriented laterally with respect to the axis of connector 10; however, aperture 35 may be any shape and may have any orientation. Apertures 35 provide additional securing of the jacket to connector 10 by allowing a portion of the jacket to remain partially uncompressed in the area of aperture 35 and therefore extend slightly into aperture 35. Such a partially uncompressed region of the jacket may make it more difficult to pull the jacket from between crimp sleeve 30 and cable end outer shell 20. To provide further protection of the cable, a boot may be added to the cable and secured to connector 10 according to a variety of known techniques, such as for example, an interference fit, a rib and a corresponding recess, and the like.

Figure 5:
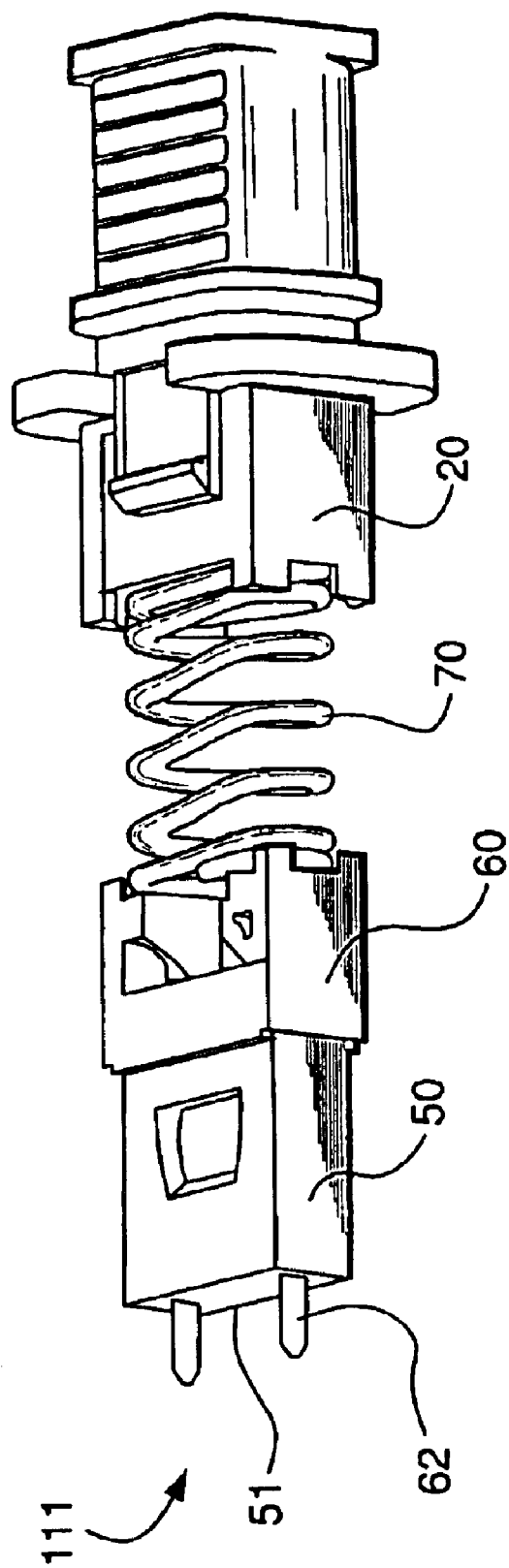
FIG. 5 is a perspective view of a portion of an illustrative connector, in accordance with an embodiment of the invention.

Cable end outer shell 20, in addition to securing the jacket of the fiber optic cable, cooperates with other components to provide a mating surface 51 for the optic fibers, as shown in FIG. 5. Ferrule 50 comprises a mating surface 51 for aligning optic fibers for mating with another connector (not shown). To align mating surface 51 to another connector having a mating surface (not shown), ferrule 50 is coupled to pin holder 60 that comprises alignment pins 62 extending through ferrule 50. To provide a force for biasing the mating surfaces together, pin holder 60 is coupled to contact spring 70. Contact spring 70 biases pin holder 60 and ferrule 50 towards mating end 41 of connector 10.

Returning now to ferrule 50, ferrule 50 is generally rectangularly shaped and has a plurality of parallel grooves (not shown) therethrough for receiving a plurality of optic fibers. The grooves may be any shape suitable for receiving and securing the optic fibers (which may number one, four, eight, twelve, or any other number of optic fibers) and holding the ends of the optic fibers at mating surface 51.

Ferrule 50 also has a pair of grooves (not shown) for receiving alignment pins 62. To reduce backward reflections at mating surface 51, mating surface 51 may be inclined at an angle.

Figure 6B:
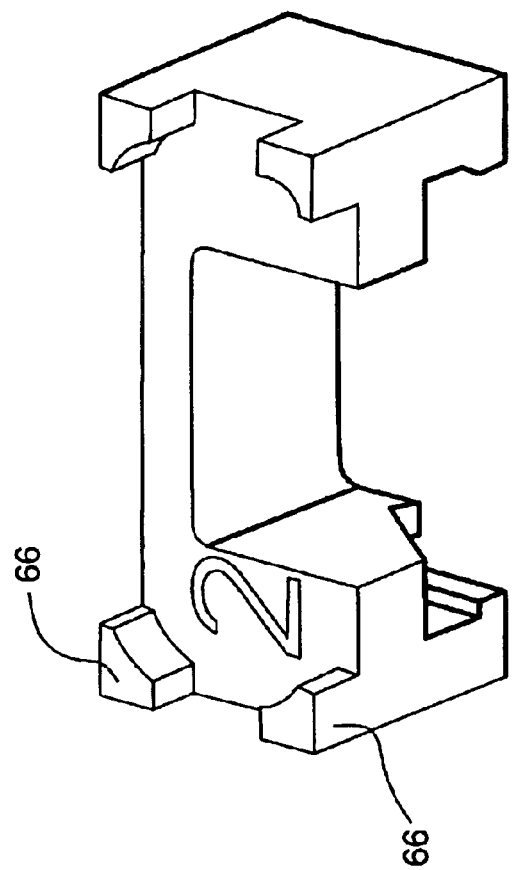
FIGS. 6a and 6b are perspective views of an illustrative pin holder, in accordance with an embodiment of the invention.
Figure 6A:
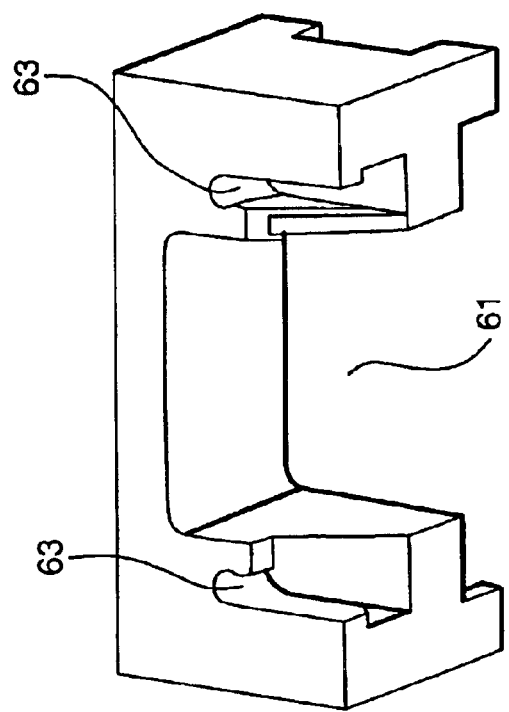

As shown in FIGS. 6a and 6b, pin holder 60 is substantially rectangularly shaped and has a void 61 therethrough for receiving optic fibers. Pin holder 60 has, on one side, a pair of grooves 63 for receiving alignment pins 62 (FIG. 5). Pin holder 60 has, on an opposing side, a plurality of nubs 66 extending axially that receive contact spring 70 (FIG. 5). Nubs 66 are similar to nubs 28.

Figure 7:
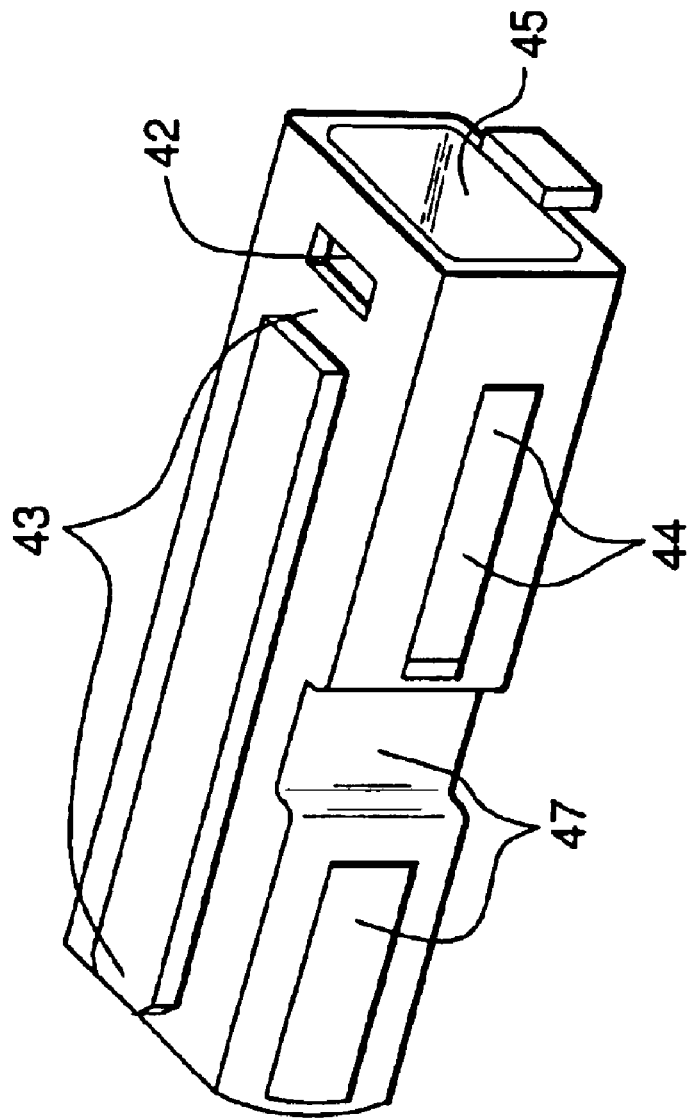
FIG. 7 is a perspective view of an illustrative mating end outer shell, in accordance with an embodiment of the invention.

Turning now to mating end outer shell 40, as shown in FIG. 7, mating end outer shell 40 is substantially rectangularly shaped (but may be any shape that cooperates with coupling sleeve 80) and has a cavity 45 therethrough for receiving ferrule 50, pin holder 60, and contact spring 70.

Cavity 45 is substantially rectangularly shaped and corresponds to the shape of ferrule 50, pin holder 60, and contact spring 70; however, cavity 45 may be any shape that corresponds to ferrule 50, pin holder 60, and contact spring 70 allowing ferrule 50 and pin holder 60 to move axially within cavity 45. For example, cavity 45 may be substantially round, square, elliptical, and the like.

Figure 8:
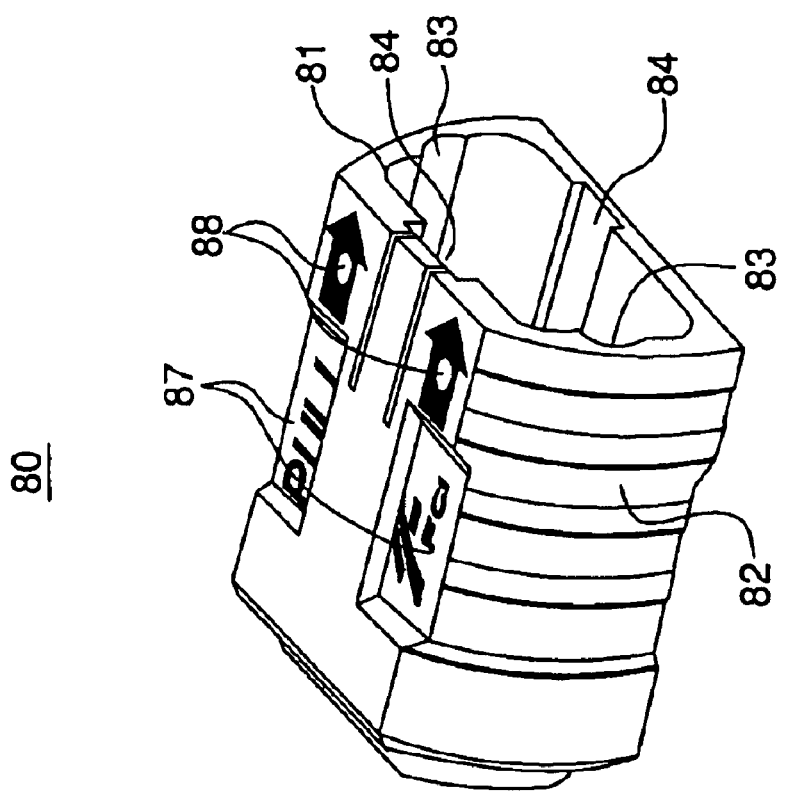
FIG. 8 is a perspective view of an illustrative coupling sleeve, in accordance with an embodiment of the invention.
Figure 9:
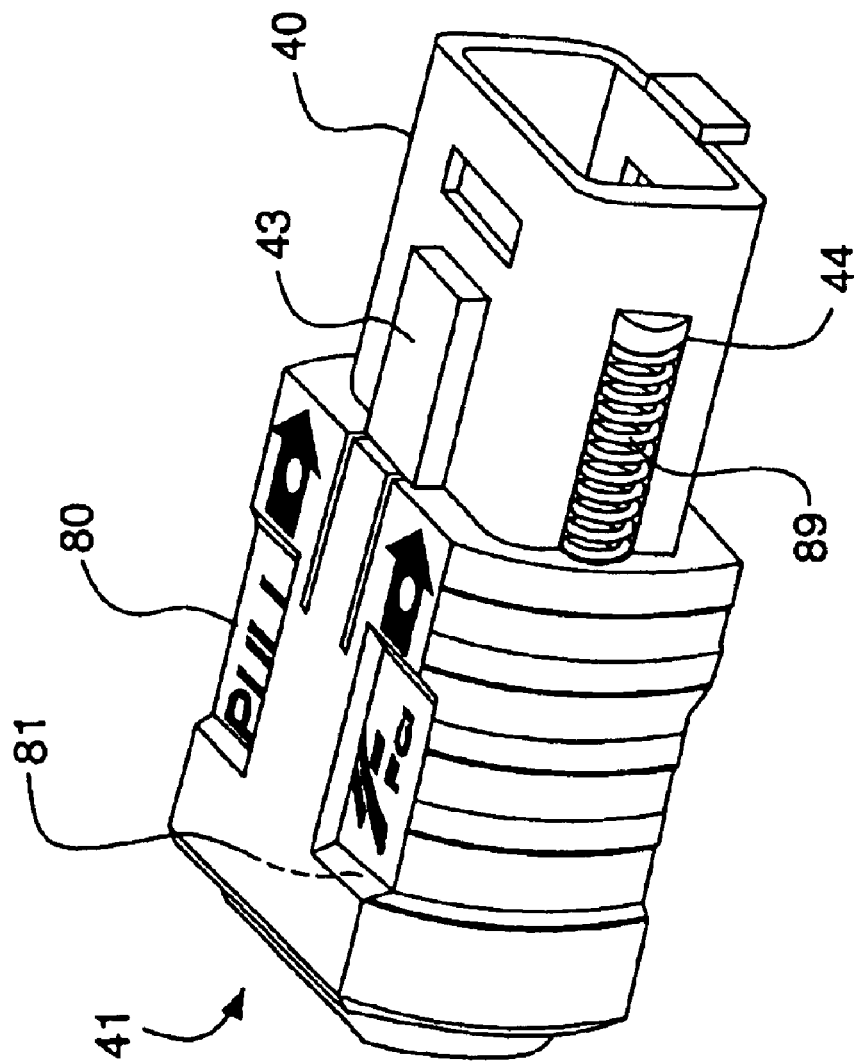
FIG. 9 is a perspective view of a portion of an illustrative connector, in accordance with an embodiment of the invention.

Mating end outer shell 40 has a recess 42 for receiving latch 27 of cable end outer shell 20 (FIG. 2), thereby securing cable end outer shell 20 to mating end outer shell 40. Mating end outer shell 40 has a respective track 43 disposed axially along each of the top and bottom of mating end outer shell 40 for guiding and securing coupling sleeve 80 (FIG. 8). Mating end outer shell 40 also has a respective recess 44 disposed axially along each of the sides of mating end outer shell 40 for receiving release spring 89 and for biasing coupling sleeve 80 (FIG. 9). Mating end outer shell 40 comprises recessed portions 47 on opposing sides of mating end outer shell 40 that cooperates with coupling sleeve 80 (FIG. 8) for push-pull type connection to another connector or device.

As shown in FIG. 8, coupling sleeve 80 is generally rectangularly shaped and has a cavity 81 therethrough for receiving mating end outer shell 40, illustrated in FIG. 9. Returning to FIG. 8, coupling sleeve 80 has a ridged outer surface 82 for providing grip. Coupling sleeve 80 further has a plurality of recessed regions 87 of the top of coupling sleeve 80 and a plurality of recessed regions 87 on the bottom of coupling sleeve 80 (not shown). Coupling sleeve 80 also has a pair of holes 88 through the top of coupling sleeve 80 and a pair of holes 88 through the bottom of coupling sleeve 80. Holes 88 may be used to assist removing the connector, for example, by receiving a tool into holes 88. Coupling sleeve 80 also has a pair of axial recesses 83 on the sides of the inner surface to receive release spring 89 (FIG. 9). Coupling sleeve 80 also has a pair of axial recesses 84 on the top and bottom of the inner surface to receive track 43 of mating end outer shell 40, as seen in FIG. 9.

As shown in FIG. 9, mating end outer shell 40 is disposed in cavity 81 of coupling sleeve 80. Release spring 89 is disposed in recess 44 of mating end outer shell 40 and biases coupling sleeve 80 towards the mating end 41 of connector 10. In this manner, coupling sleeve 80 may have a first position for locking connector 10 to a mating connector (not shown) and a second position for releasing connector 10 from the mating connector.

Figure 10B:
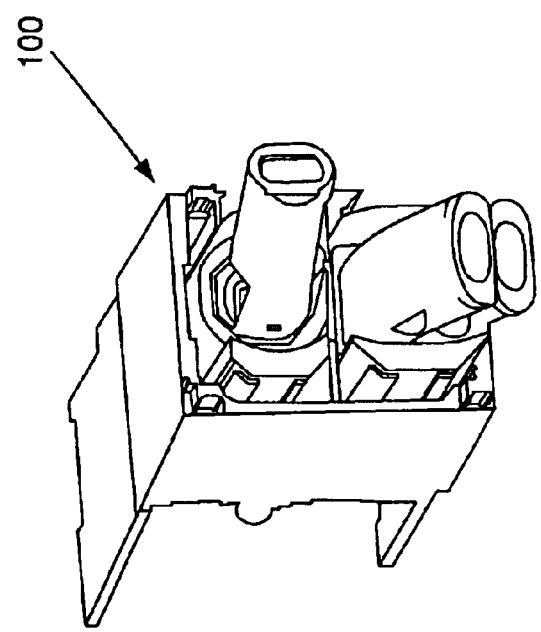
FIG. 10b is perspective view of an illustrative coupling sleeve in an exemplary backplane housing, in accordance with an embodiment of the invention.
Figure 10A:
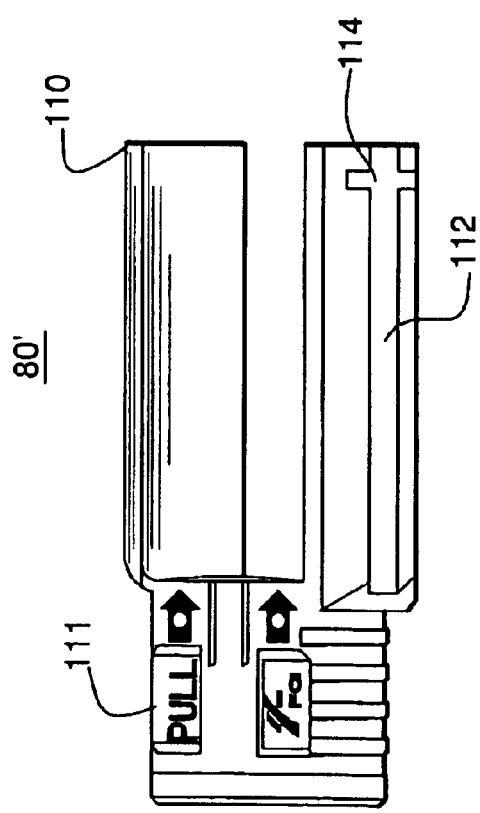
FIG. 10a is a perspective view of an illustrative coupling sleeve, in accordance with another embodiment of the invention.

In another embodiment of the invention, fiber optic connection is to a backplane housing, such as shown in FIG. 10b. Backplane housing 100, as can be seen, obstructs access to coupling sleeve 80, thereby making it difficult for a person (not shown) to connect and disconnect a fiber optic connector. To overcome this difficulty, coupling sleeve 80', as shown in FIG. 10a comprises a body portion 111 and arms 110 extending axially along the connector towards cable end 41 of connector 10. Arms 110 are disposed on opposite sides of the axis. At least one arm 110 has an axially oriented groove 112 for mating with a corresponding ridge of a backplane housing. At least one arm 110 has a circumferentially oriented notch 114 for mating with a tool (not shown) adapted to engage in notch 114 for removal of the connector from backplane housing 100. In this manner, a connector with coupling sleeve 80' can be easily removed from backplane housing 100 even though access to body portion 111 (that is normally gripped to remove the connector) is obstructed by backplane housing 100.

In yet another embodiment of the invention, a cable guide and a boot are provided for further protecting the fiber optic cable. FIG. 11a shows an illustrative cable guide 1100. As shown in FIG. 11a, cable guide 1100 comprises a body 1110, a mating head 1130, a rotation control device 1114, and a rigidity member 1112.

Body 1110 has a first end 1102 for receiving a fiber optic cable (not shown) and a second end 1103 for mating with a boot 1150 (see FIG. 1b, for example). Body 1110 may be shaped as a curved cylinder; alternatively, body 1110 may be rectangular, oval, and the like. The curvature of body 1110 is curved at a radius (e.g., providing a radius of curvature greater than the minimum bending radius of the cable). Body 1110 has an outer diameter that typically decreases toward first end 1102. Body 1110 may be molded from a suitable non-flammable elastic material such as plastic, or the like.

Body 1110 defines a passageway 1120 therethrough for receiving a fiber optic cable. Passageway 1120 is dimensioned to allow a user to insert a cable therethrough and may be used for guiding, bending, and/or twisting (if desired) the cable. Passageway 1120 at first end 1102 may be shaped to retain the cable is a particular orientation. For example, if the cable is a fiber optic tape, first end 1102 may be generally rectangularly shaped to receive and retain the fiber optic tape. At second end 1103, passageway 1120 may be shaped to allow body 1110 to rotate without rotating the cable disposed therein. Between the first end 1102 and the second end 1103, passageway 1120 may be tapered so as not to interfere with the twisting of the fiber optic cable.

In order to mold a curved section having an internal passageway 1120 extending between continuous ends (i.e., without a slit or other break in the material), mold pieces (not shown) preferably have features (not shown) that also form cut out windows along the length of cable guide 1100. This allows the mold pieces to be separated from cable guide 1100 after the molding process.

Mating head 1130 is disposed at second end 1103 of cable guide 1100 and has an opening (not shown) therethrough. Mating head 1130 is adapted to mate with a boot 1150, as described in more detail below. For example, mating head 1130 is substantially cylindrically shaped and is sized to be received in a cylindrically shaped recess of boot 1150. Mating head 1130, however, may be other shapes that cooperate with boot 1150, such as, for example, square, oval, and the like. Mating head 1130 may be a separate part or may be formed integrally with body 1110.

Mating head 1130 may further comprise a plurality of interference ribs 1132 disposed on the outer surface of mating head 1130 and oriented substantially parallel to the axis of the opening. Interference ribs 1132 function to provide an interference fit with boot 1150 upon mating of the cable guide 1100 to boot 1150. While interference ribs 1132 are illustrated as implementing an interference fit, other devices may be used to implement an interference fit, such as for example, a tapered surface, a raised cylindrical bump, and the like.

Rotation control device 1114 controls the rotation of cable guide 1100 relative to boot 1150. As shown, rotation control device 1114 may be a key disposed proximate second end 1103 of body 1110 and extending outwardly from body 1110. Alternatively, rotation control device may be an extension member, a projection, a tab, and the like. While rotation control device 1114 is shown as each being connected to body 1110, rotation control device 1114 may, alternatively, be connected to mating head 1130. Rotation control device 1114 may be a separate part or may be formed integrally with body 1110.

Rigidity member 1112 extends outwardly from body 1110 and is disposed generally parallel with passageway 1120. Rigidity member 1112 provides rigidity to cable guide 1110. Rigidity member 1112 may be a separate part or may be formed integrally with body 1110.

Mating head 1130 and rotation control device 1114 cooperate with boot 1150 to provide a connection that can provide protection to a fiber optic cable from bending and twisting. An illustrative boot 1150 is shown in FIG. 1b. As shown in FIG. 11b, boot 1150 comprises a body 1160 and a rotation control device 1163.

Body 1160 typically is substantially cylindrically shaped and has a first end 1152 for mating with cable guide 1100 and a second end 1153 for mating with a connector, such as for example, connector 10 of FIG. 1. Body 1160 defines a passageway 1170 therethrough for receiving a fiber optic cable. Passageway 1170 may be shaped to retain the cable is a particular orientation. For example, if the cable is a fiber optic tape, passageway 1170 may be generally rectangularly shaped, as shown. The exterior of the boot 1150 is typically shaped to be detachably connectable with a connector, for example, connector 10 (having an associated or complementary shape to receive boot 1150).

At first end 1152, body 1160 may be circular, as shown, or may be any shape that cooperates with cable guide 1100 for mating and allows cable guide 1100 to rotate (with a limited rotation) with respect to boot 1150.

Rotation control device 1163 functions to limit the rotation of cable guide 1100, when cable guide 1100 is mated to boot 1150. As shown, rotation control device 1163 extends axially from first end 1152 of body 1160 and defines two rotation control surfaces 1164. Rotation control device 1163 extends from a portion of body 1160, as shown, about one-half of the cross section of body 1160, thereby defining rotation control surfaces 1164 at the sides of body 1160, as illustrated in FIG. 11b. Although described herein as extending about one-half of the cross section of body 1160 to defined rotation control surfaces 1164, rotation control device may extend any desired amount of the cross section of body 1160.

Rotation control surfaces 1164 cooperate with rotation control device 1114 of cable guide 1100 to limit the rotation of cable guide 1100 relative to boot 1150. As shown in FIG. 11c, cable guide 1100 is disposed in first end 1152 of boot 1150 and can rotate therein. As can be seen in FIG. 11c, at some point in the rotation of cable guide 1100, rotation control device 1114 contacts rotation control surface 1164, thereby limiting rotation of cable guide 1100.

Alternatively, rotation control device 1163 may be a recessed groove (not shown) in the inner surface of passageway 1170. The groove may traverse only a circumferentially portion of the inner surface, thereby defining rotation control surfaces (not shown) at the ends of the groove.

Boot 1150 may comprise a locking ring 1162. As shown in FIG. 11b, locking ring 1162 is disposed at first end 1152 of boot 1150 and extends inwardly from an inner surface of passageway 1170. Locking ring 1162 cooperates with interference ribs 1132 to detachably mate cable guide 1100 to boot 1150.

The mating of boot 1150 to cable guide 1100 is typically performed by inserting cable guide 1110 onto boot 1150, and more particularly, is typically performed by inserting first end 1152 of cable guide 1110 onto second end 1103 of boot 1150. The connection is then maintained typically by interference ribs 1132 extending past locking ring 1162 and providing an interference fit.

Figure 12B:
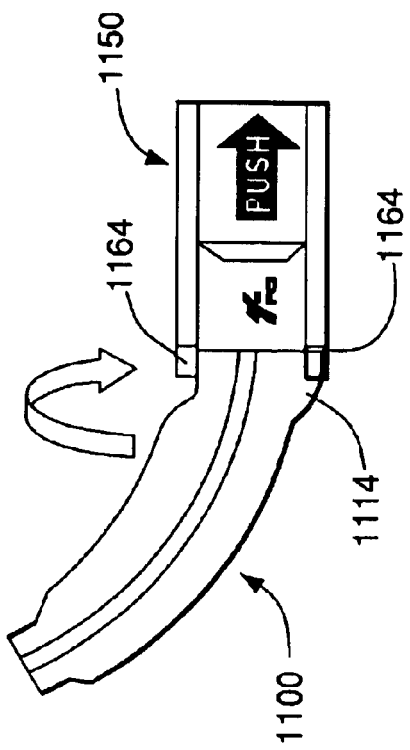
FIG. 12b is a top view of an illustrative boot mated to an illustrative cable guide with the boot rotated in a second direction, in accordance with an embodiment of the invention.
Figure 12A:
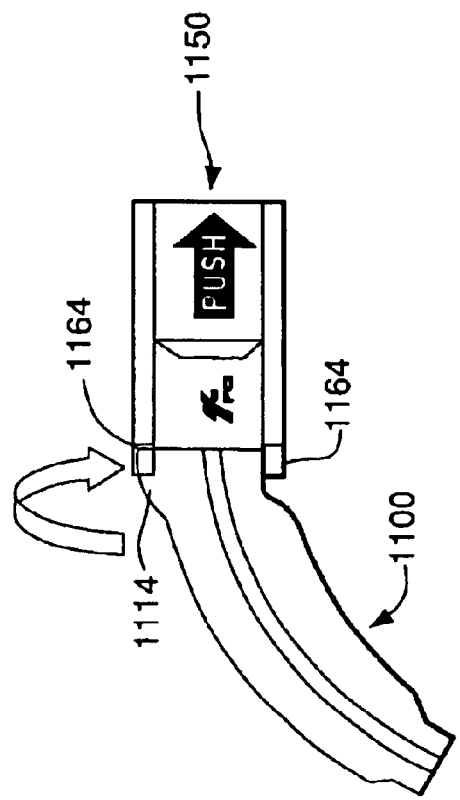
FIG. 12a is a top view of an illustrative boot mated to an illustrative cable guide with the boot rotated in a first direction, in accordance with an embodiment of the invention.

Once mated, cable guide 1100 may be rotated with respect to boot 1150, as described in connection with FIGS. 12a and 12b. As shown in FIG. 12a, cable guide 1100 is mated with boot 1150 and cable guide 1100 is rotated in a first direction (e.g., about 90 degrees counterclockwise) from the top of boot 1150. In this position, rotation control device 1114 is in contact with a first rotation control surface 1164. Alternatively, as shown in FIG. 12b, cable guide 1100 is mated with boot 1150 and cable guide 1100 is rotated in a second direction (e.g., about 90 degrees clockwise) from the top of boot 1150. In this position, rotation control device 1114 is in contact with a second rotation control surface 1164. While the rotation control function is implemented with a rotation control key 1114 of cable guide 1100 and a rotation control surface 1164 of boot 1150, alternatively, boot 1150 may comprise a rotation control key and cable guide 1100 may comprise a rotation control surface. It is contemplated that other rotation angles may be implemented, such as, for example, about 45 degrees clockwise and about 45 degrees counterclockwise, about 90 degrees clockwise and about 0 degrees counterclockwise, and the like.

Figure 13:
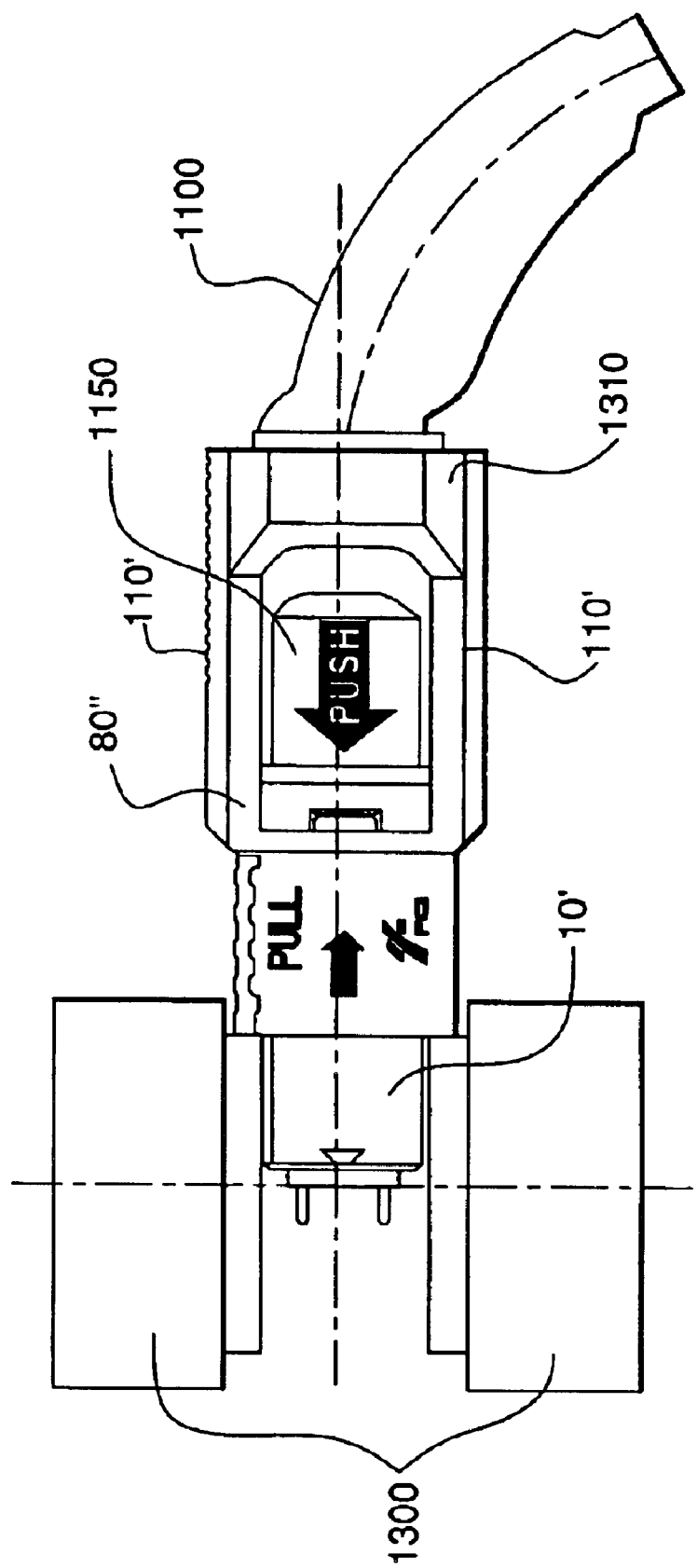
FIG. 13 is a top view of an illustrative boot and cable guide mated to an illustrative connector, in accordance with an embodiment of the invention.

Cable guide 1100 and boot 1150 may be used with a connector to provide a fiber optic connection system that resists excessive cable bending, twisting, and accidental pullout. FIG. 13 shows cable guide 1100 and boot 1150 in combination with a connector 10' having a coupling sleeve 80". As shown, coupling sleeve 80" comprises a pair of arms 110' and an annular section 1310 connected to a distal end of pair of arms 110'. Such an annular section 1310 may provide easy gripping for a user to disconnect the connector system.

Figure 14:
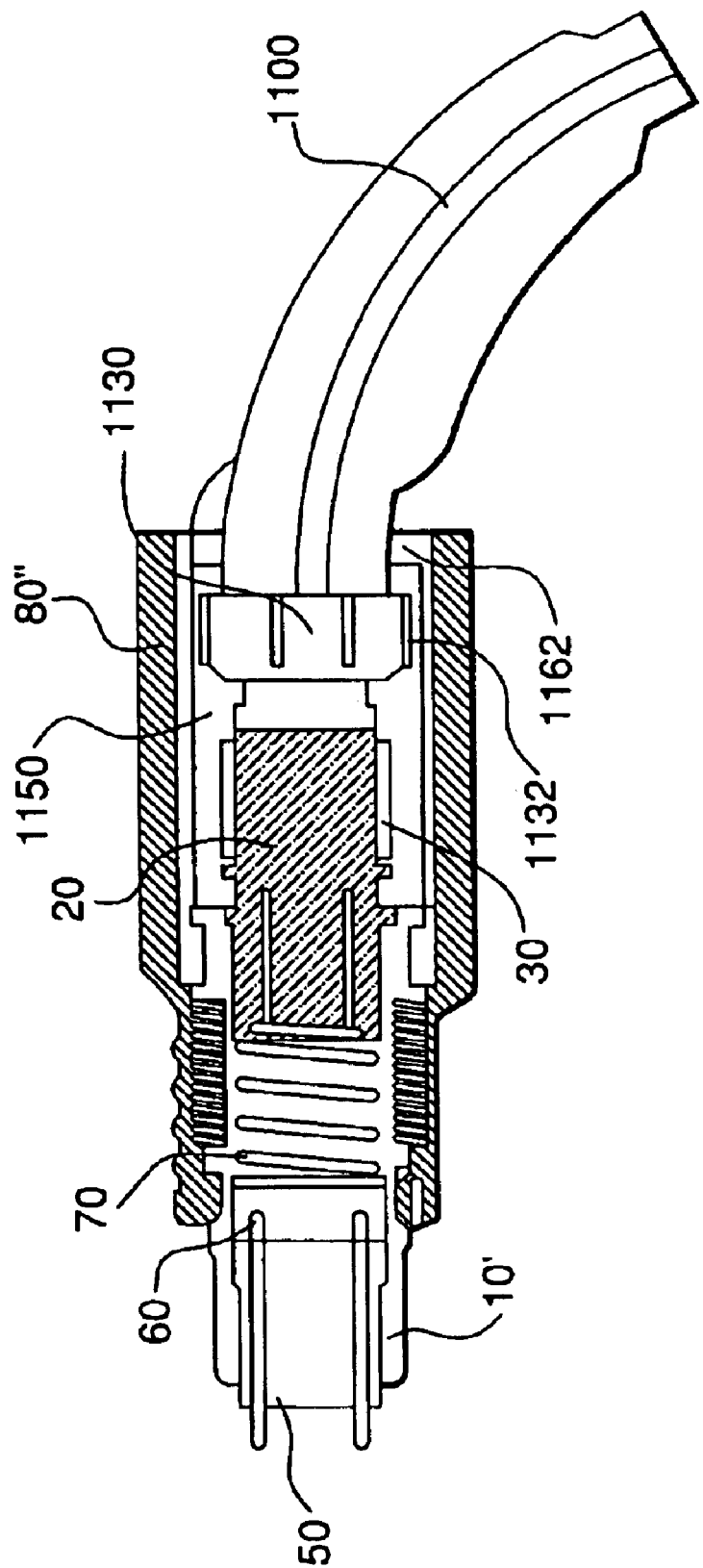
FIG. 14 is a partial top cut-away view an illustrative boot and cable guide mated to an illustrative connector, an accordance with an embodiment of the invention.

FIG. 14 is a partial cut-away view of FIG. 13, showing further details. As shown in FIG. 14, boot 1150 mates with connector 10' by being disposed around cable end outer shell 20 and crimp sleeve 30. Boot 1150, thereby, may provide additional mechanical strength to protect the cable from damage and from being accidentally pulled out from connector 10'. Boot 1150 and cable guide 1100 further cooperate to limit the rotation, twisting, and bending of the cable, which may provide further protection to the cable. The connector system may be used to engage an adapter 1300 (FIG. 13) on a panel (not shown) or other device.

In the foregoing description, it can be seen that the invention comprises a new and useful connector for providing mechanical strength to the connection of a fiber optic cable to the connector. Further, a cable guide and boot may be used to protect against excessive cable twisting and bending.

It is to be understood that the foregoing illustrative embodiments have been provided merely for the purpose of explanation and are in no way to be construed as limiting of the invention. Words which have been used herein are words of description and illustration, rather than words of limitation. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A cable guide for a fiber optic cable, comprising:
    a body having a first end and a second end opposite the first end, the first end adapted to be rotatably coupled to a boot, the body defining a passageway from the first end to the second end for receiving the fiber optic cable; and
    a rotation key coupled to the body that limits rotation of the body with respect to the boot.

2. The cable guide as recited in claim 1, wherein the rotation key limits rotation of the body at a first and a second limit of rotation.

3. The cable guide as recited in claim 2, wherein the first limit of rotation is about 90 degrees in a first direction from a central rotational position and the second limit of rotation is about 90 degrees in a second direction from a first rotational position.

4. The cable guide as recited in claim 1, wherein the rotation key is disposed proximate the first end and is adapted to cooperate with a rotation control device of the boot.

5. The cable guide as recited in claim 1, wherein the rotation key extends outwardly from the body.

6. The cable guide as recited in claim 1, wherein the body of the cable guide is curved.

7. The cable guide as recited in claim 1, wherein the body of the cable guide is curved at a radius greater than or equal to a minimum bend radius of the fiber optic cable.

8. The cable guide as recited in claim 1, further comprising a head at the first end of the body.

9. The cable guide as recited in claim 8, wherein the head is substantially cylindrically shaped.

10. The cable guide as recited in claim 8, wherein the head comprises a plurality of interference ribs extending from the head.

11. The cable guide as recited in claim 8, wherein each interference rib is extends axially along an outer surface of the head.

12. The cable guide as recited in claim 1, further comprising a rigidity member.

13. The cable guide as recited in claim 12, wherein the rigidity member is substantially planar and extends axially from the body.

14. A boot for a fiber optic cable, comprising:
    a body having a passageway therethrough and having a first end and a second end, the first end adapted to be rotatably coupled to a cable guide, the second end opposite the first end; and
    a rotation control device coupled to the body that limits rotation of the body with respect to the cable guide.

15. The boot as recited in claim 14, wherein the rotation control device is disposed proximate the first end and is adapted to cooperate with a rotation key of the cable guide.

16. The boot as recited in claim 15, wherein the rotation control device extends axially from the first end of the body and defines a first surface at a first limit of rotation and a second surface at a second limit of rotation, the first surface disposed to abut the rotation key at the first limit of rotation and the second surface disposed to abut the rotation key at the second limit of rotation.

17. The boot as recited in claim 16, wherein the first limit of rotation is about 90 degrees in a first direction from a first rotational position and the second limit of rotation is about 90 degrees in a second direction from the first rotational position.

18. The boot as recited as recited in claim 14, wherein the rotation control device is formed by a partial circumferential recess in the inner surface of the passageway proximate the first end.

19. The boot as recited in claim 14, wherein the first end of the body is adapted to receive the cable guide and maintain mating with an interference fit.

20. The boot as recited in claim 14, further comprising a locking ring extending inwardly from the inner surface of the passageway.

21. The boot as recited in claim 14, wherein the passageway is shaped substantially rectangularly to inhibit rotation of the cable within the passageway.

22. A boot assembly for a fiber optic cable, comprising:
    a first component comprising a body and a rotation key thereon; and
    a second component comprising a body and a rotation control device coupled to the body of the second component, the body of the second component adapted to be rotatably coupled to the first component, the rotation control device adapted to engage the rotation key and limit rotation.

23. The boot assembly as recited in claim 22, wherein the first component is one of a cable guide and a boot and the second component is the other of the cable guide and the boot.

24. A method for attaching a boot to a fiber optic cable, comprising:
    inserting a fiber optic cable through a passageway of a cable guide, the cable guide comprising a body and a rotation key thereon; and
    rotatably coupling a boot comprising a rotation control device to the cable guide, the rotation control device limiting the rotation of the cable guide relative to the boot.

25. The method as recited in claim 24, further comprising locking the cable guide to the boot with an interference fit.

26. The method as recited in claim 24, further comprising rotating the cable guide to a first rotational position.

* * * * *